(12) United States Patent
Huang et al.

(10) Patent No.: US 12,455,417 B2
(45) Date of Patent: Oct. 28, 2025

(54) MPO ADAPTER FOR APC CONNECTOR INSPECTION

(71) Applicant: Panduit Corp., Tinley Park, IL (US)

(72) Inventors: Yu Huang, Orland Park, IL (US); Jose M. Castro, Naperville, IL (US); Andrew R. Matcha, Chicago, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/668,419

(22) Filed: May 20, 2024

(65) Prior Publication Data

US 2024/0302600 A1 Sep. 12, 2024

Related U.S. Application Data (63) Continuation of application No. 17/693,656, filed on Mar. 14, 2022, now abandoned.

(51) Int. Cl.
*G02B 6/38* (2006.01)

(52) U.S. Cl.
CPC ................. *G02B 6/3825* (2013.01)

(58) Field of Classification Search
CPC .................................. G02B 6/3825
See application file for complete search history.

(56) References Cited

U.S. PATENT DOCUMENTS

| | | |
|---|---|---|
| 8,164,744 B2 | 4/2012 | Narum et al. |
| 9,915,790 B2 | 3/2018 | Baribault |
| 12,050,149 B2 * | 7/2024 | Cote .................. G06V 10/10 |
| 2014/0354977 A1 | 12/2014 | Zhou et al. |
| 2015/0177469 A1 | 6/2015 | Nadeau |
| 2016/0170151 A1 | 6/2016 | Baribault |
| 2021/0302663 A1 | 9/2021 | Verheyden |

\* cited by examiner

*Primary Examiner* — Sung H Pak
(74) *Attorney, Agent, or Firm* — Christopher K. Marlow; Christopher S. Clancy; James H. Williams (57) ABSTRACT

A fiber optic adaptor has a first face defining a first central axis and a second face opposite the first face defining a second central axis, wherein the first central axis is at an angle relative to the second central axis. In one embodiment, the angle matches the angle of the front face of an APC connector.

2 Claims, 12 Drawing Sheets

Fig 1 Side view of UPC MPO connector and APC MPO connector

Fig 2 Standard MPO adaptor

103 Standard MPO adaptor

Image of an UPC connector endface inspected by a microscope adaptor for UPC inspection and a standard MPO adaptor.

Image of APC connector endface inspected by a microscope adaptor for UPC inspection and a standard MPO adaptor.

Image of APC connector endface inspected by a microscope adaptor for APC inspection and a standard MPO adaptor.

MPO ADAPTER FOR APC CONNECTOR INSPECTION

CROSS REFERENCE TO RELATED APPLICATION

This application is a continuation of U.S. patent application Ser. No. 17/693,656, filed Mar. 14, 2022, the entirety of which is hereby incorporated by reference herein.

FIELD OF INVENTION

The present invention relates generally to the field of optical network interconnection and optical assemblies and, more specifically, to apparatus and methods to inspect optical fiber connector endface while optimizing network installation.

BACKGROUND AND PRIOR ART EVALUATION

Fiber optic links are extremely sensitive to dust, oil, and other contaminants on the mating connector face. In the case of single-mode fiber (SMF) links, contaminated connectors can reduce return loss (increase reflection), increase relative intensity noise, multipath interference, and insertion loss. Moreover, a single particle placed in the fiber core can completely block the optical signal from passing between two connectors.

Due to its larger core size, multimode fiber (MMF) links are less affected by contaminated connectors. Therefore, it is less likely that optical contamination can completely block light from a connector. However, the connector contamination can still significantly impact the channel performance due to increased attenuation, modal power distribution, and modal noise.

As the demand for higher data rates continues to grow, the optical channels, SMF and MMF, are exposed to higher transmission penalties and therefore becoming more sensitive to contamination in the connector end faces. An essential issue with contaminated connectors is that they can permanently damage their connector endface and contaminate or damage the mated connector.

It is crucial to verify that the connector endface is cleaned before connection during the network installation. The degree of cleanliness can be determined using a fiber inspection tool, which typically consists of an illuminator, a lens, an image sensor, a focus system, and a display to image the connector's endface.

There are several apparatuses for visual inspection. For example, US Patent Application Pub. No. 2011/0085159 discloses a portable inspection system with a lens and a camera with autofocus functionalities. In addition, US Patent Application Pub. No. 2004/0125366 discloses a method for automated inspection of the fiber, including center, focus, capture images, and analysis of the contamination of the connector end face. The connectors to be inspected include several types of single, duplex, such as LC, SC, FC, ST, CS, SN connectors, or parallel optical connectors such as MTP/MPO connectors. Among them, MTP/MPO connectors have the most fiber count and the largest endface. Hence it is more challenging and time-consuming to inspect them.

Based on the connector endface, there are two types of connectors, UPC and APC connectors. UPC stands for Ultra-Physical Contact, and PC stands for Physical Contact. APC stands for Angle Polished Connector. The tip of the APC connector has an angle on it. This angle prevents back reflections which will seriously degrade the performance of any fiber optic system. Hence APC connectors have better performance.

Figure 1:
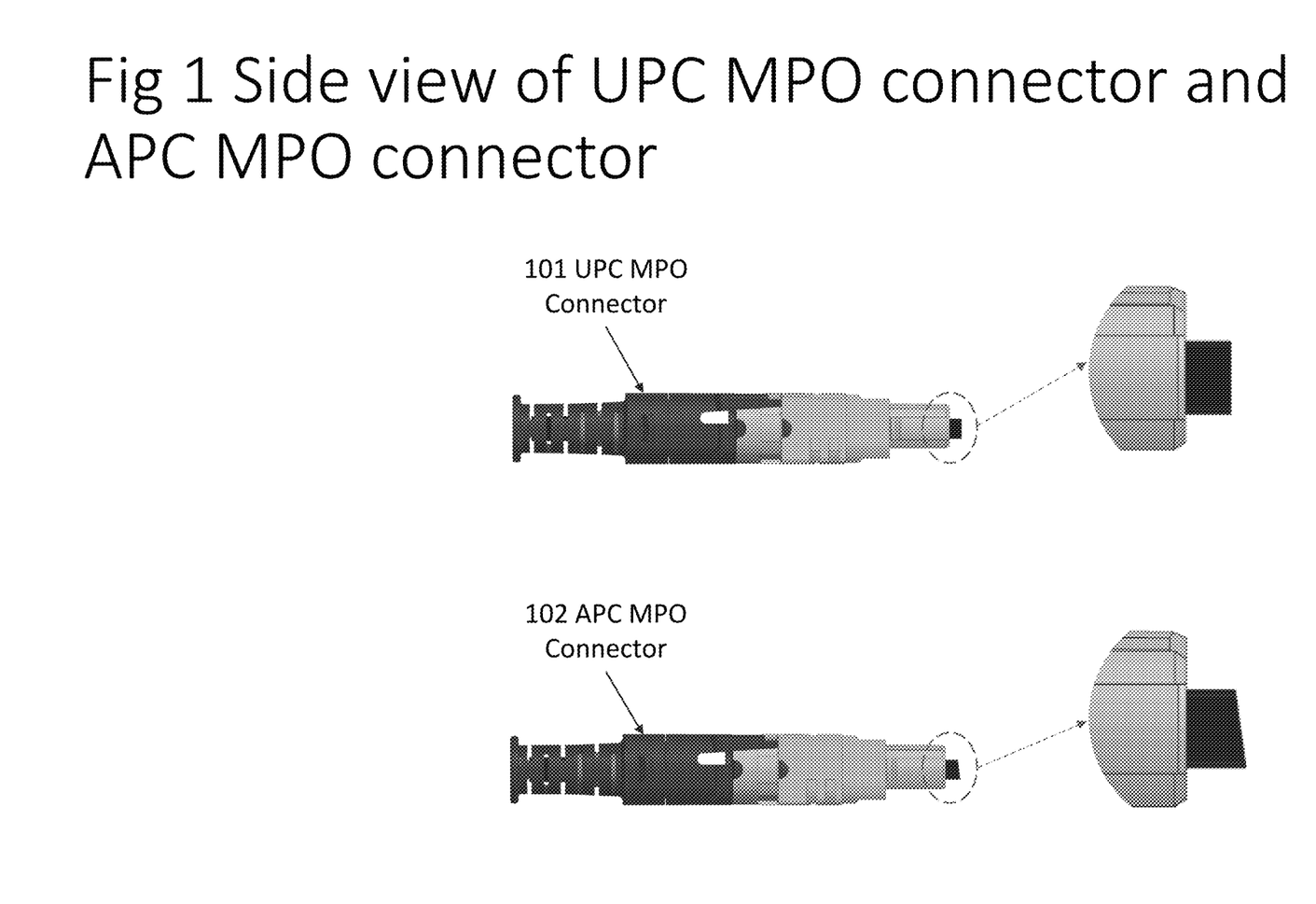
FIG. 1 shows the side view of a UPC MPO connector 101 (top) and the side view of a UPC MPO connector 102 (bottom).

FIG. 1 shows the side view of a UPC MPO connector 101 (top) and the side view of a UPC MPO connector 102 (bottom).

An MPO adaptor connects two MPO connectors and provides the connection between cable to cable or cable to equipment in the MPO style.

Figure 2:
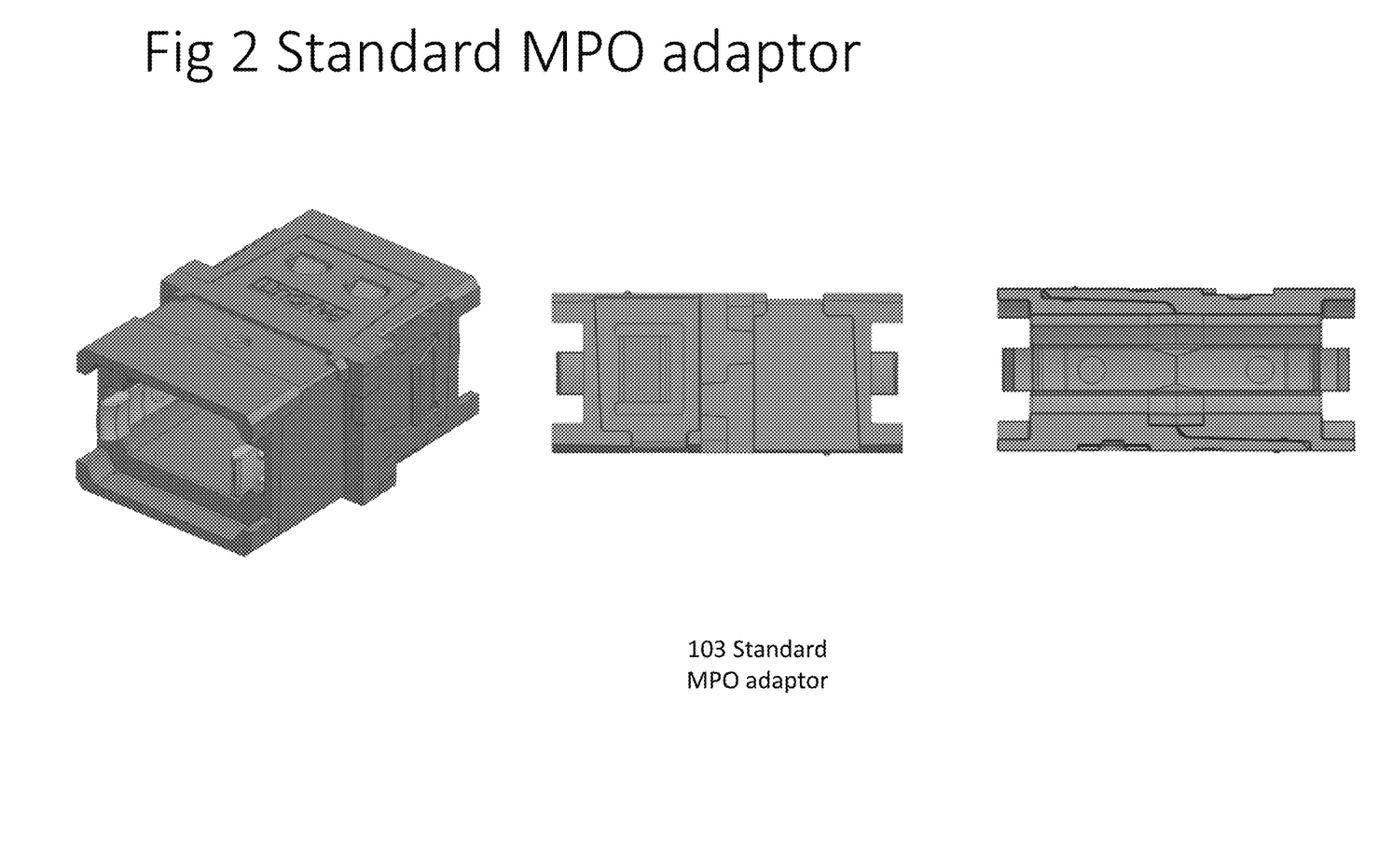
FIG. 2 shows the 3D view (left), side view (middle), and intersecting surface (right) of a standard MPO adaptor 103.

FIG. 2 shows the 3D view (left), side view (middle), and intersecting surface (right) of a standard MPO adaptor 103. The openings for both faces of the UPC MPO adapter define a single central axis 120 for the entire adaptor. Since the physical and mechanical properties of the APC connector are pretty different from UPC or PC, this means APC should not be mated with UPC or PC. MPO adaptor is also used to inspect the endface of an MPO connector as it can fix the MPO connector endface to the tip of the microscope adaptor.

Figure 3:
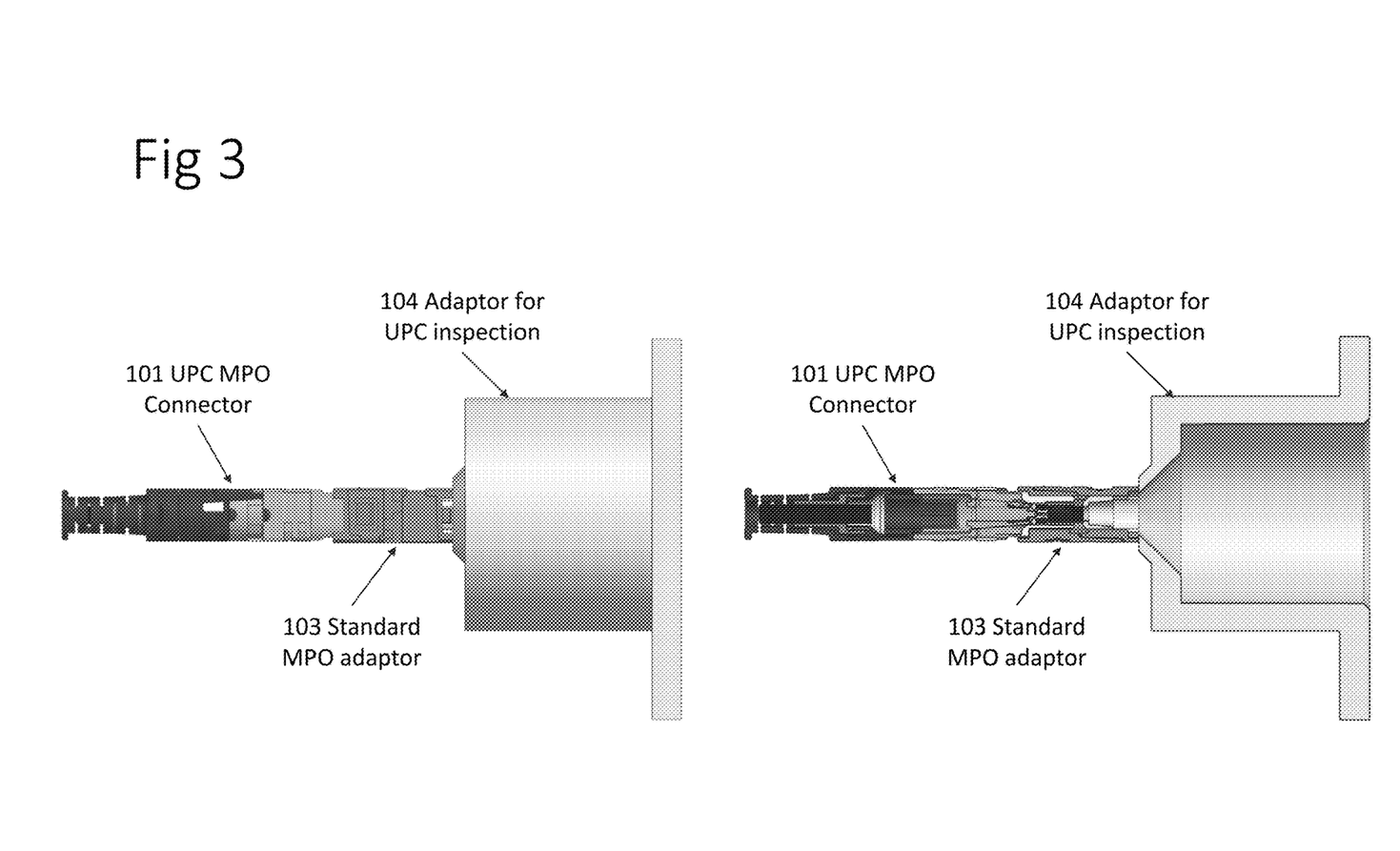
FIG. 3 shows that a UPC MPO connector is connected to a microscope adaptor for UPC inspection 104 by a standard MPO adaptor.

FIG. 3 shows that a UPC MPO connector is connected to a microscope adaptor for UPC inspection 104 by a standard MPO adaptor. However, since the physical and mechanical properties of the APC connector are pretty different from UPC or PC, we cannot use a microscope adaptor for UPC inspection and a standard MPO adaptor to inspect the APC MPO adaptor.

Figure 4:
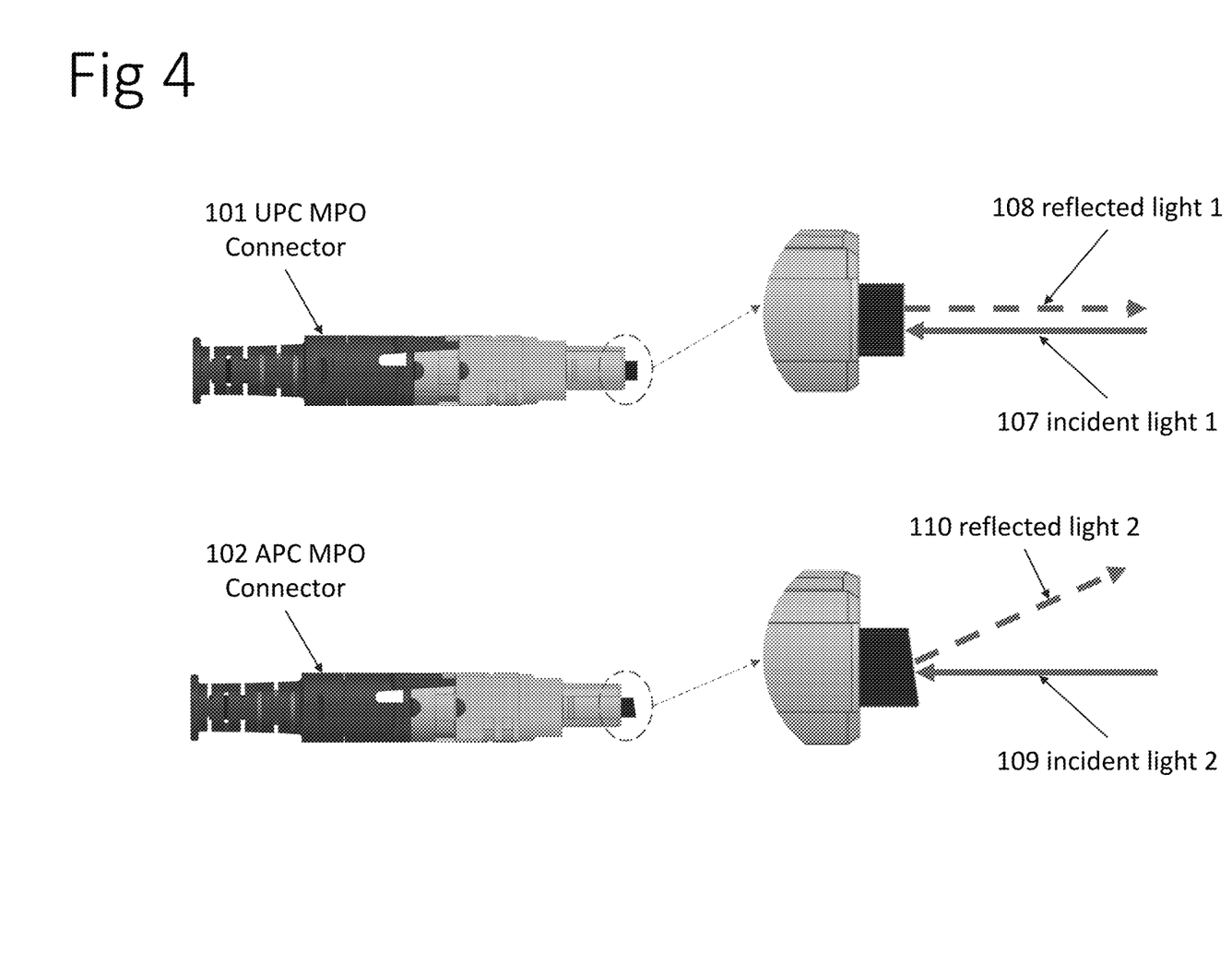
FIG. 4 (top) shows that an incident light 1 107 from the microscope illumination system goes to a UPC MPO connector 101, is reflected by the endface of the connector, and generates a reflected light 1 108, which goes back to the microscope.

FIG. 4 (top) shows that an incident light 1 107 from the microscope illumination system goes to a UPC MPO connector 101, is reflected by the endface of the connector, and generates a reflected light 1 108, which goes back to the microscope. This allows it to form a good image with high contrast on the camera sensor. On the other hand, FIG. 4 (bottom) shows that an incident light 2 109 from the microscope illumination system goes to an APC MPO connector 102, is reflected by the endface of the APC connector, and generates a reflected light 2 110, which is deviated by the APC connector's and does not go back to the microscope. Since the deviated light will become noise and the image is also very weak, the signal-noise ratio of the image is poor. Hence it will form a poor image with low contrast on the camera sensor.

Figure 5:
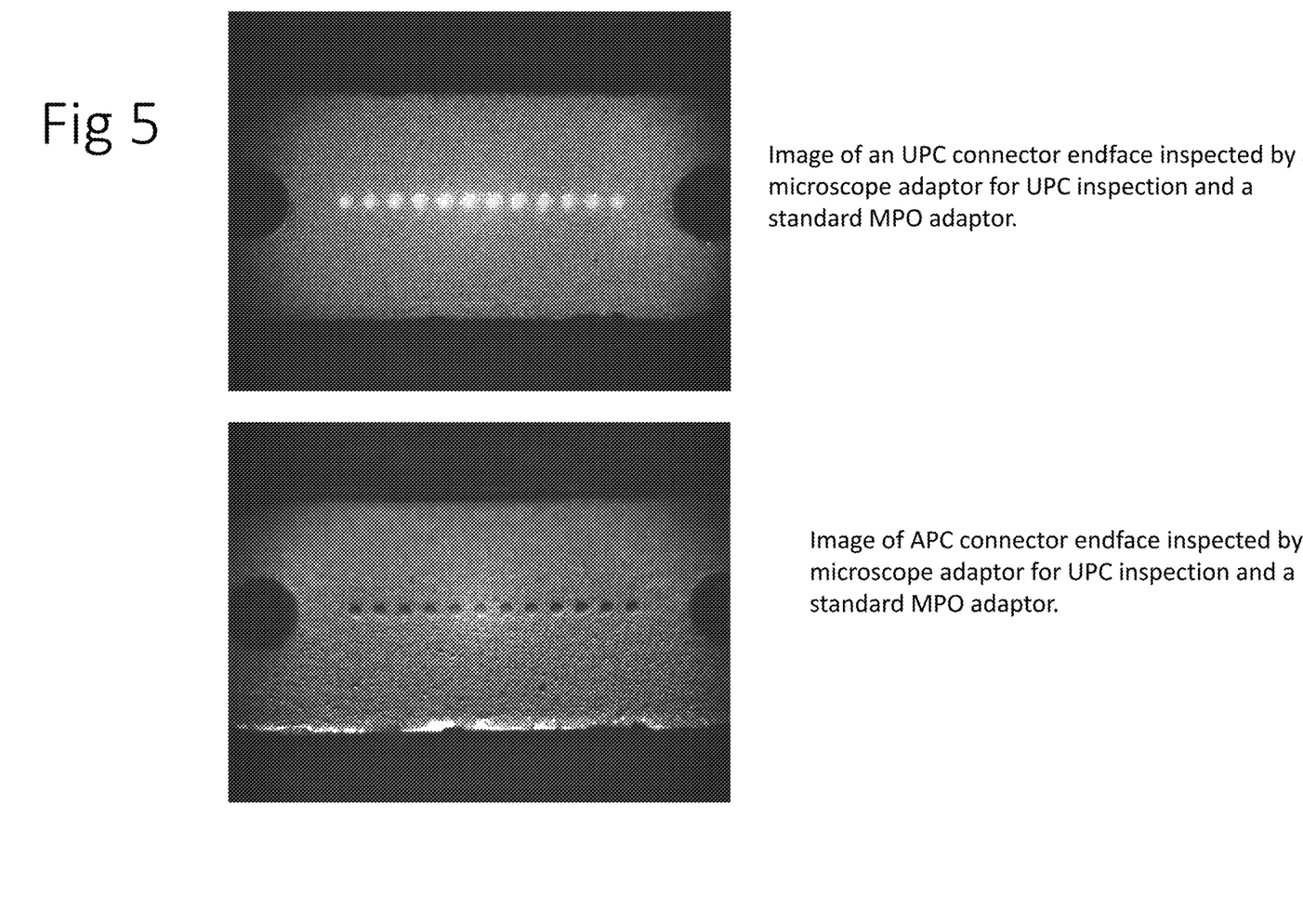
FIG. 5 (top) shows the image of a UPC connector endface inspected by a microscope using an adaptor for UPC inspection and a standard MPO adaptor.

FIG. 5 (top) shows the image of a UPC connector endface inspected by a microscope using an adaptor for UPC inspection and a standard MPO adaptor. FIG. 5 (bottom) shows the image of an APC connector endface inspected by a microscope using an adaptor for UPC inspection and a standard MPO adaptor. From the two images, we can tell the image quality of the APC MPO connector is not acceptable. We have to use different parts to inspect the APC MPO connector.

Figure 6:
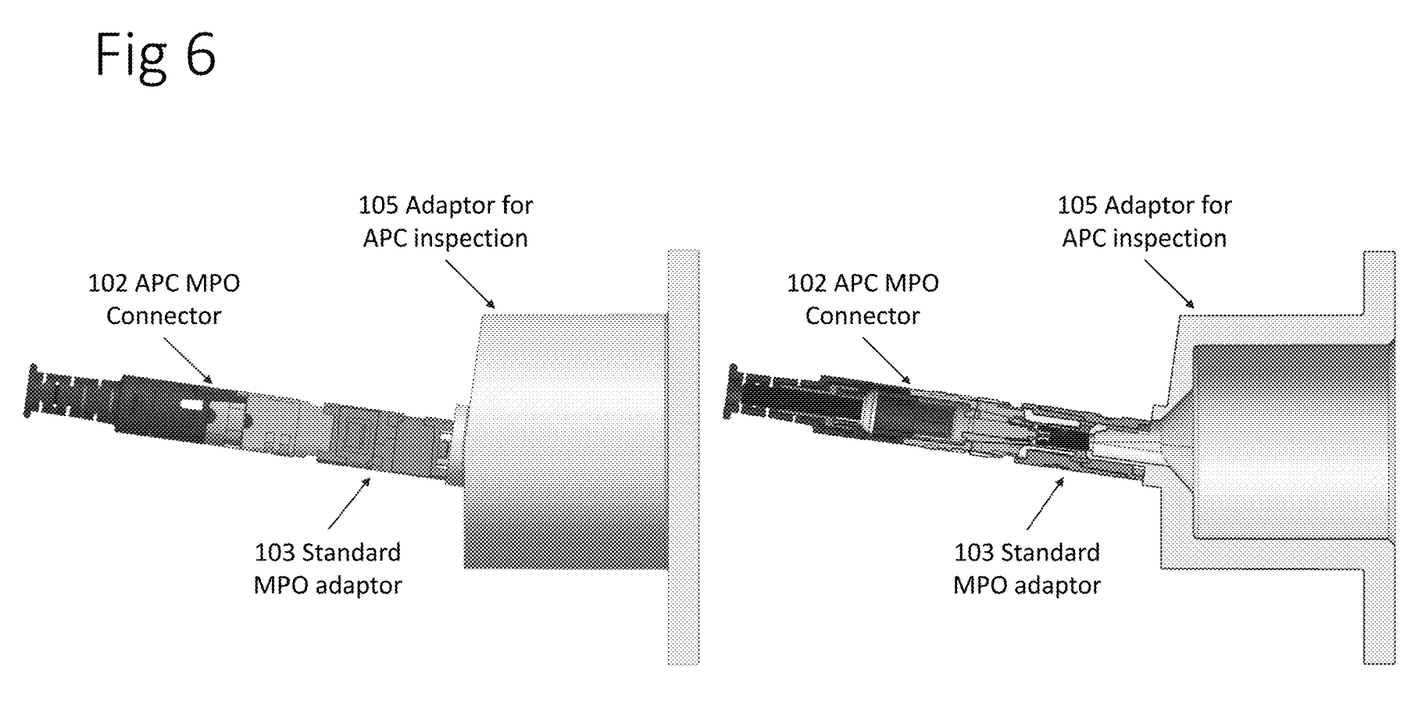
FIG. 6 shows that an APC MPO connector is connected to a microscope adaptor for APC inspection 105 by a standard MPO adaptor 103.

FIG. 6 shows that an APC MPO connector is connected to a microscope adaptor for APC inspection 105 by a standard MPO adaptor 103. The adaptor for APC inspection 105 has an angle to compensate the angle of APC MPO connector 102 so that the APC MPO connector 102 endface is inspected by the microscope at precisely the same position and same angle as the UPC MPO connector 101 endface under adaptor for UPC inspection 104. In this way, the APC image quality will be as good as the UPC image quality.

Figure 7:
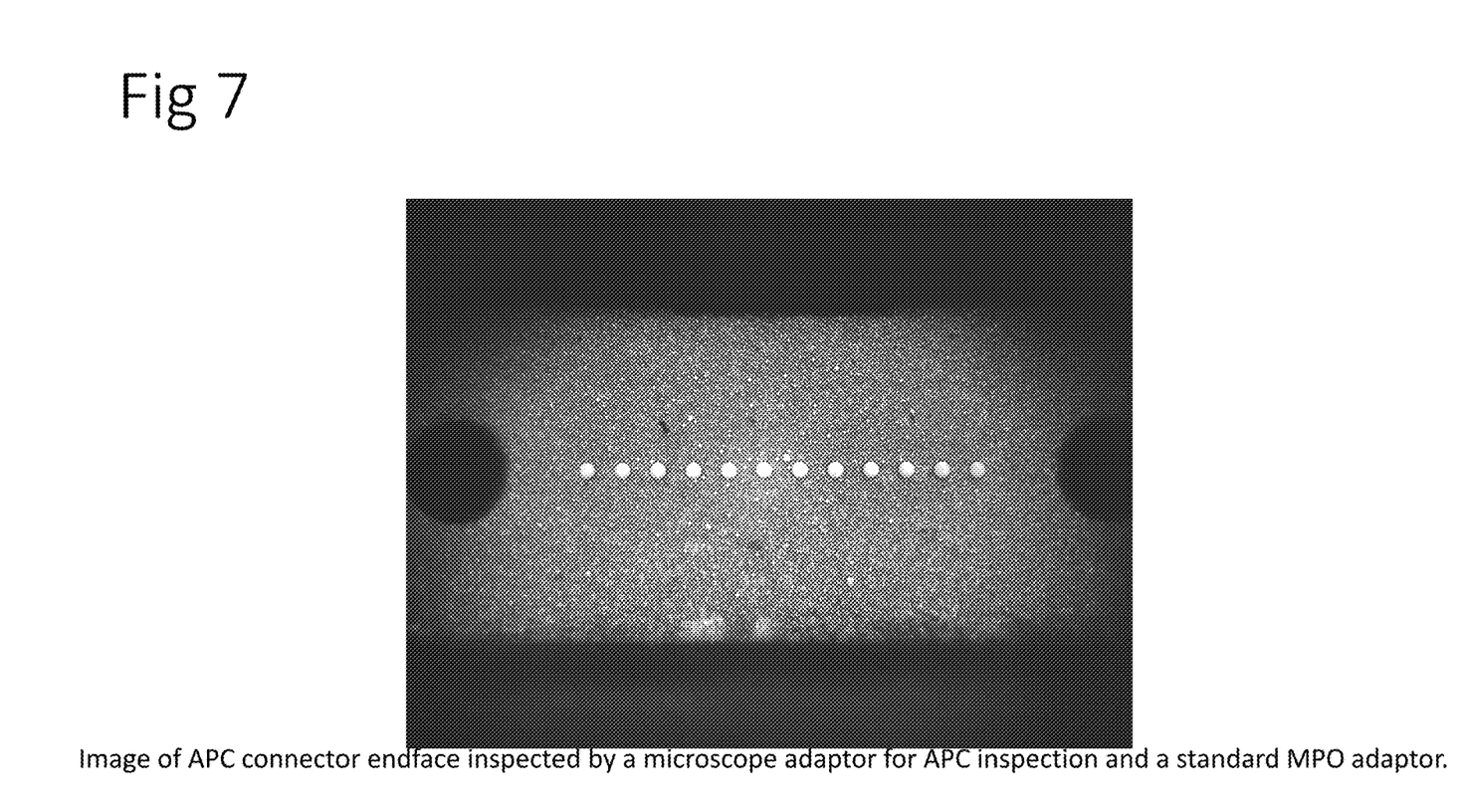
FIG. 7 shows the image of an APC MPO connector 102 endface inspected by a microscope using an adaptor for APC inspection 105 and a standard MPO adaptor 103.

FIG. 7 shows the image of an APC MPO connector 102 endface inspected by a microscope using an adaptor for APC inspection 105 and a standard MPO adaptor 103. The image quality of the APC MPO connector 102 is acceptable.

Although the inspection of APC MPO connector is achieved by changing to a microscope adaptor for APC inspection 105, the cost of a new microscope adaptor that can view 12 fiber at one time is relatively high, about one thousand USD to a few thousand USD as the metal adaptor has a lot of precise future. Moreover, changing the microscope adaptor takes some time too.

Figure 8:
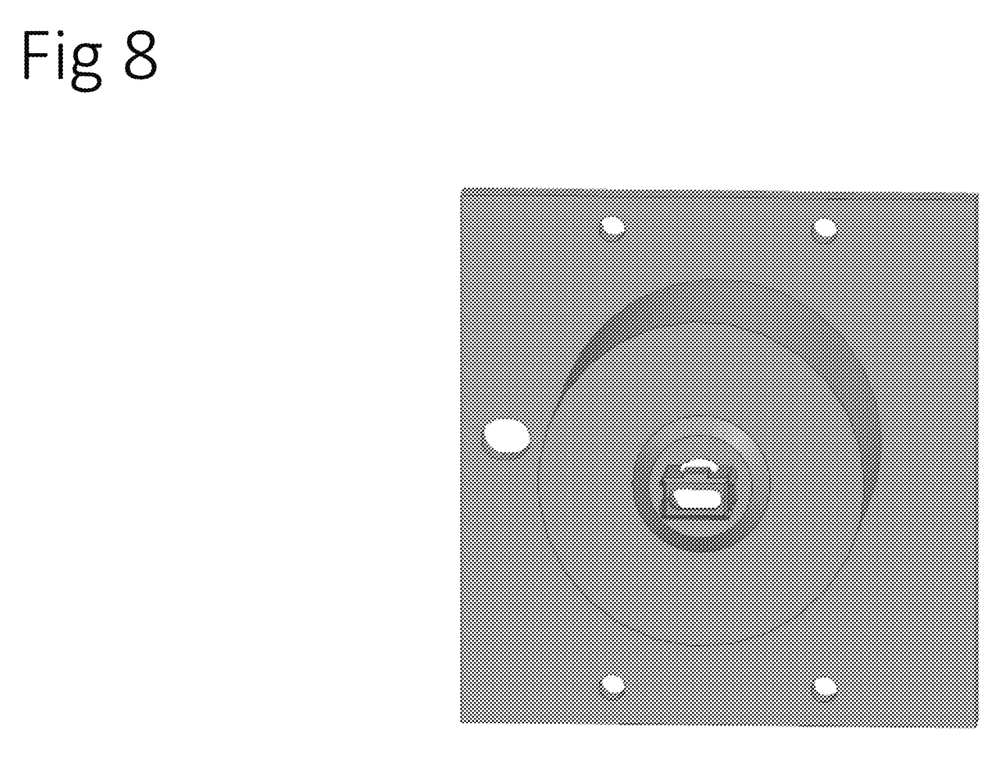
FIG. 8 shows a front view of the microscope adaptor for UPC inspection. To attach it to the microscope body, one has to fix it with four screws.

FIG. 8 shows a front view of the microscope adaptor for UPC inspection. To attach it to the microscope body, one has to fix it with four screws. Therefore, changing the adaptor between UPC and APC back and forth will take a lot of time. Moreover, it may reduce the precision of the adaptor's mechanical geometry in the long term.

SUMMARY

A fiber optic adaptor has a first face defining a first central axis and a second face opposite the first face defining a second central axis, wherein the first central axis is at an angle relative to the second central axis. IN one embodiment, the angle matches the angle of the front face of an APC connector.

DESCRIPTION OF INVENTION

This invention discloses an apparatus and method for fast switching between inspection of UPC and APC connectors.

Figure 9:
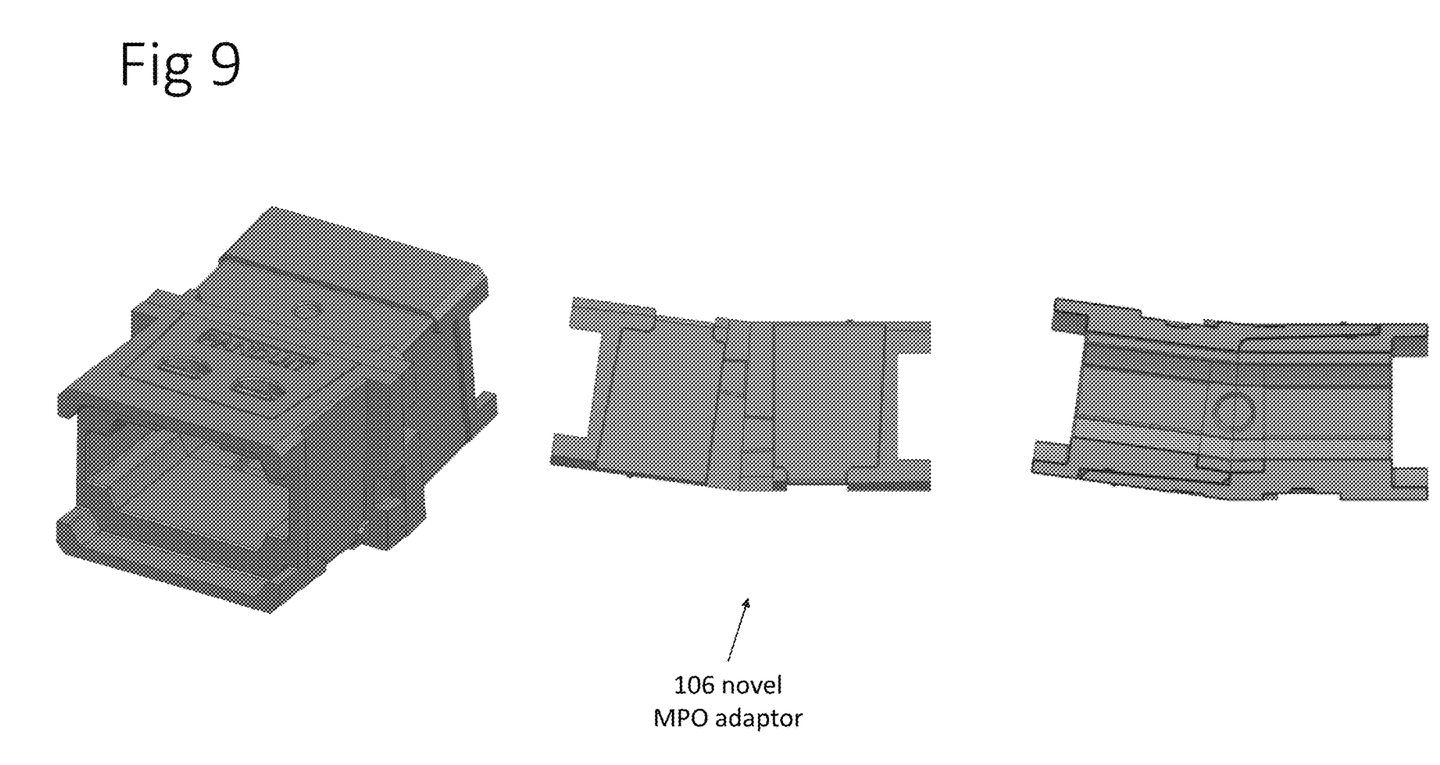
FIG. 9 shows the 3D view (left), side view (middle), and intersecting surface (right) of a novel MPO adaptor 106.

FIG. 9 shows the 3D view (left), side view (middle), and intersecting surface (right) of a novel MPO adaptor 106. This adaptor has a first face on a first end defining a first central axis 121 and a second face on a second end defining a second central axis 122. The first central axis is at an angle relative to the second central axis. In one embodiment, the angle matches the angle of the APC MPO connector. Such adaptors can be made by 3D printing, injection molding, or machining metal or plastic material.

Figure 10:
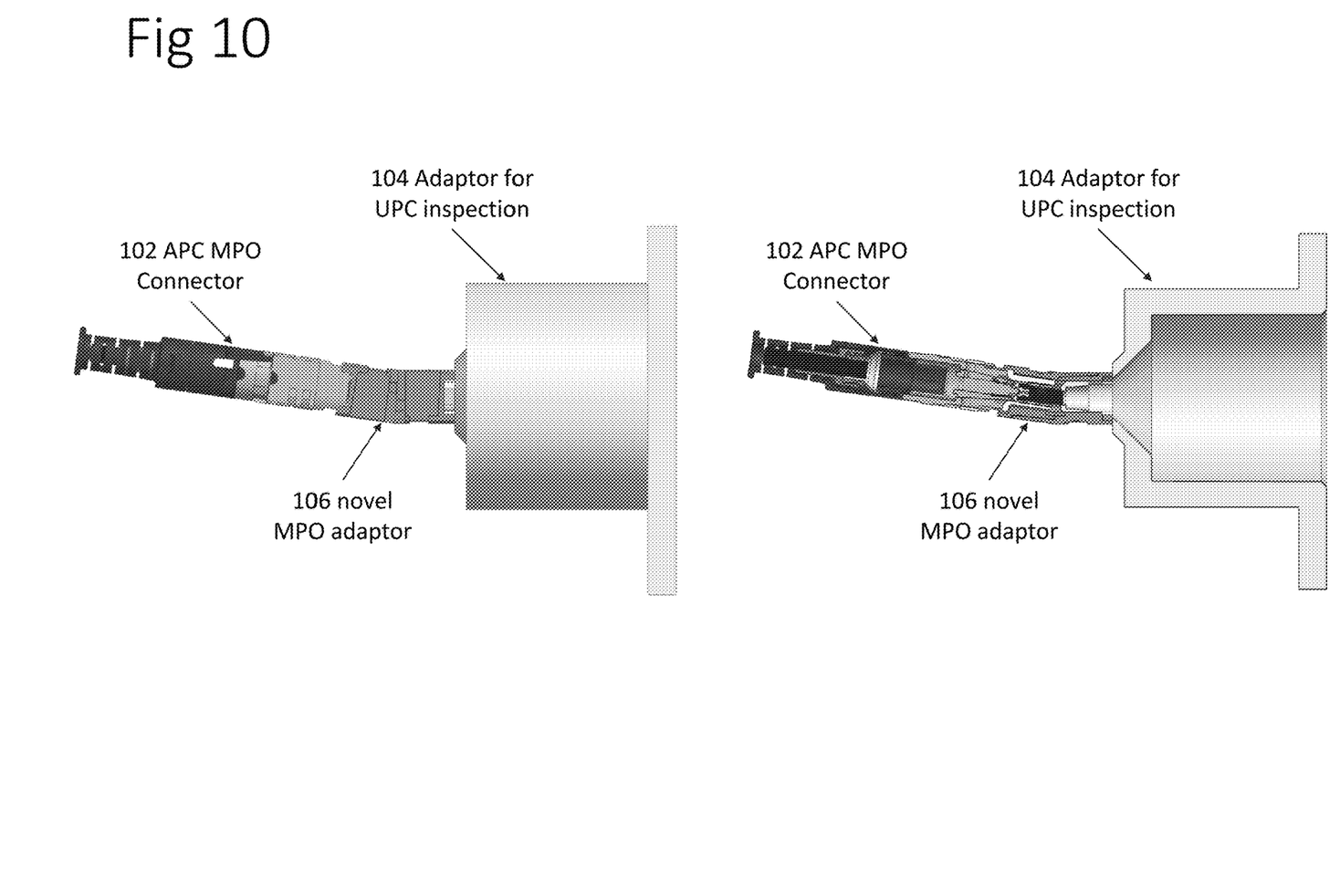
FIG. 10 shows that an APC MPO connector 102 is connected to a microscope adaptor for UPC inspection 104 by the novel MPO adaptor 106.

FIG. 10 shows that an APC MPO connector 102 is connected to a microscope adaptor for UPC inspection 104 by the novel MPO adaptor 106. Since the novel MPO adaptor 106 has an angle to compensate the angle of the APC MPO connector 102, the APC MPO connector 102 endface is inspected by the microscope at exactly the same position and same angle as the UPC MPO connector 101 under adaptor for UPC inspection 104. In this way, the APC image quality will be as good as the UPC image quality.

Figure 11:
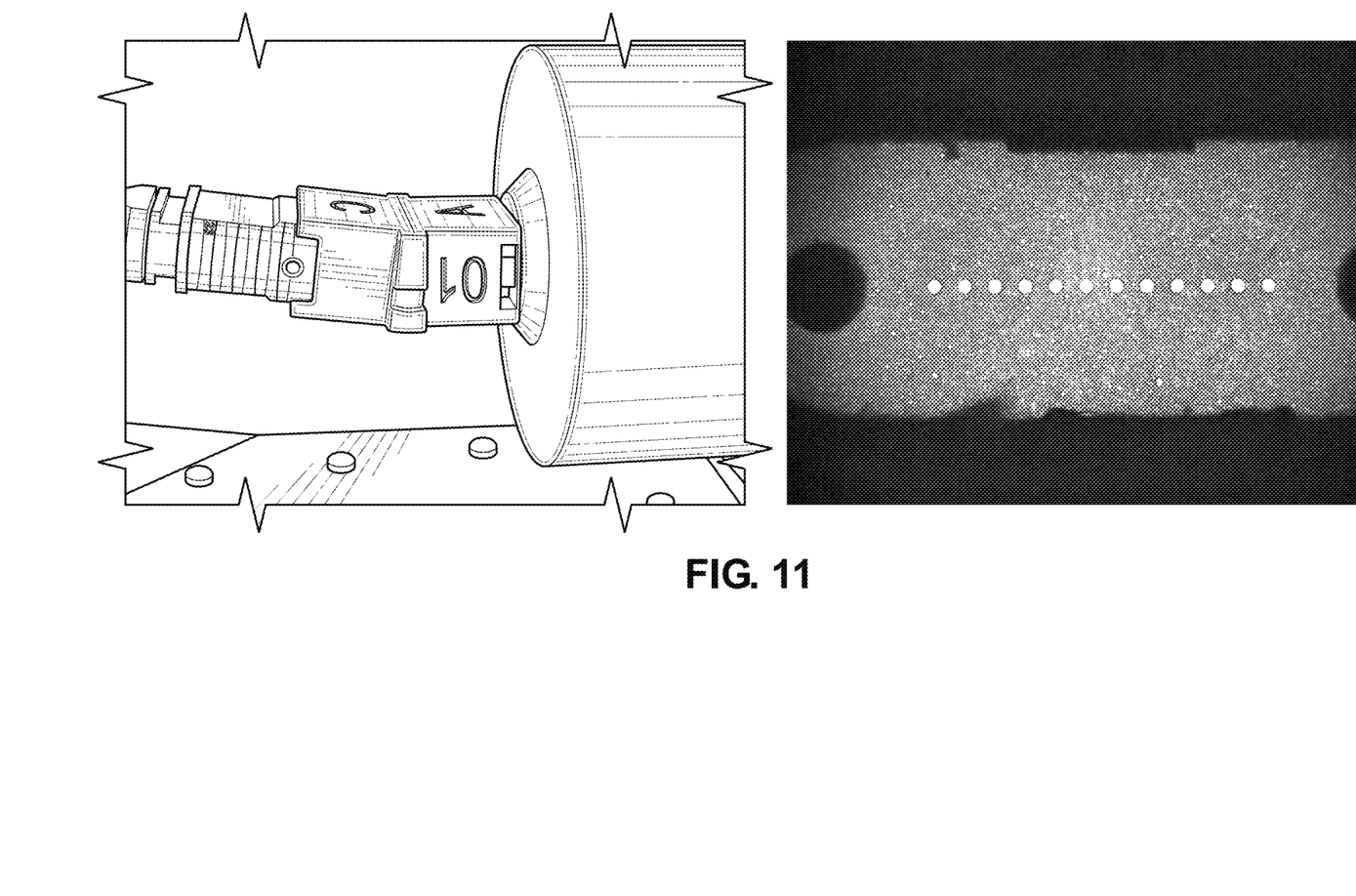
FIG. 11 shows the image of an APC MPO connector 102 endface inspected by a microscope using an adaptor for UPC inspection 104 and the prototype of a novel MPO adaptor 106.

FIG. 11 shows the image of an APC MPO connector 102 endface inspected by a microscope using an adaptor for UPC inspection 104 and the prototype of a novel MPO adaptor 106. The image quality of the APC MPO connector 102 is acceptable.

Figure 12:
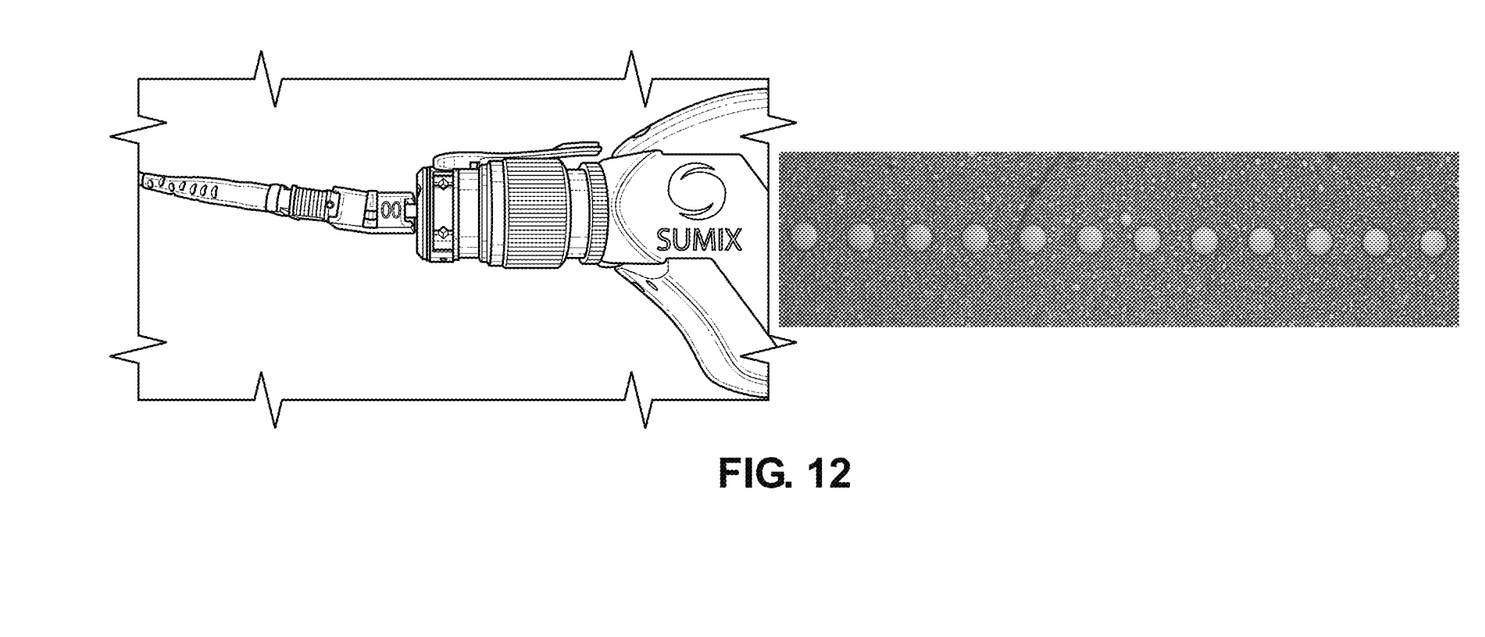
FIG. 12 shows the image of an APC MPO connector 102 endface inspected by a commercial microscope using an adaptor for UPC inspection 104 and the prototype of a novel MPO adaptor 106.

FIG. 12 shows the image of an APC MPO connector 102 endface inspected by a commercial microscope using an adaptor for UPC inspection 104 and the prototype of a novel MPO adaptor 106. The image quality of the APC MPO connector 102 is acceptable. Furthermore, we can see that the novel MPO adaptor 106 can achieve APC MPO connector inspection using inspection microscopes made by any manufacturers.

Although we only have shown the prototype of a novel MPO adaptor which allows to inspect APC MPO connector using an adaptor for UPC inspection, the same concept and design can be applied to other types of connectors such as LC, CS, SN connectors with 1.25 mm diameter ferrule, and SC, FC, ST connectors with 2.5 mm diameter ferrule.

What is claimed is:

1. A system for inspecting an angle polish connector (APC) type multi-fiber push on (MPO) type connector comprising:
    a microscope with an integrated Ultra-Physical Contact (UPC) type connector adapter; and
    an MPO adapter with a first face defining a first central axis and having an opening configured to accept an MPO type connector and a second face opposite the first face defining a second central axis and having an opening configured to accept an MPO type connector, wherein the first central axis is at an angle relative to the second central axis.

2. The system of claim 1 wherein the angle matches the angle of the front face of an APC connector.

* * * * *